United States Patent
Bae

(10) Patent No.: US 10,340,736 B2
(45) Date of Patent: Jul. 2, 2019

(54) WIRELESS POWER TRANSMISSION DEVICE AND WIRELESS POWER CHARGING SYSTEM INCLUDING THE SAME

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 50 days.

(21) Appl. No.: 15/534,144

(22) PCT Filed: Dec. 2, 2015

(86) PCT No.: PCT/KR2015/013095
§ 371 (c)(1),
(2) Date: Jun. 8, 2017

(87) PCT Pub. No.: WO2016/093550
PCT Pub. Date: Jun. 16, 2016

(65) Prior Publication Data
US 2018/0342895 A1 Nov. 29, 2018

(30) Foreign Application Priority Data

Dec. 9, 2014 (KR) .................. 10-2014-0176123

(51) Int. Cl.
*H02J 7/00* (2006.01)
*H02J 50/10* (2016.01)
(Continued)

(52) U.S. Cl.
CPC .............. *H02J 50/10* (2016.02); *H01F 27/28* (2013.01); *H01F 27/2871* (2013.01);
(Continued)

(58) Field of Classification Search
CPC ...................................................... H02J 7/025
(Continued)

(56) References Cited

U.S. PATENT DOCUMENTS

| 8,421,407 | B2 * | 4/2013 | Johnson | H02J 7/025 108/65 |
| 2010/0207771 | A1 * | 8/2010 | Trigiani | B60L 11/1816 340/636.1 |
| 2012/0161537 | A1 | 6/2012 | Kamata | |
| 2012/0256585 | A1 * | 10/2012 | Partovi | H01F 5/003 320/108 |
| 2013/0005252 | A1 * | 1/2013 | Lee | H04B 5/0037 455/41.1 |

(Continued)

FOREIGN PATENT DOCUMENTS

| JP | 2014-168359 A | 9/2014 |
| KR | 10-2014-0012359 A | 2/2014 |

(Continued)

OTHER PUBLICATIONS

International Search Report for PCT/KR2015/013095 (PCT/ISA/210) dated May 4, 2016.

*Primary Examiner* — Yalkew Fantu
(74) *Attorney, Agent, or Firm* — Birch, Stewart, Kolasch & Birch, LLP

(57) ABSTRACT

A wireless power transmission device includes a mounting member, first and second terminals mounted on the mounting member and a transmission coil connected to the first and second terminals. The transmission coil includes an outer transmission coil and an inner transmission coil extending from the outer transmission coil and having a radius less than that of the outer transmission coil, and a distance between the outer transmission coil and the inner transmission coil is in a range from 20 mm to 30 mm.

14 Claims, 10 Drawing Sheets

(51) Int. Cl.
*H02J 50/00* (2016.01)
*H01F 27/28* (2006.01)
*H01F 38/14* (2006.01)
*H01F 27/29* (2006.01)
*H02J 7/02* (2016.01)
*H01F 27/36* (2006.01)

(52) U.S. Cl.
CPC .............. *H01F 27/29* (2013.01); *H01F 38/14* (2013.01); *H02J 7/00* (2013.01); *H02J 7/025* (2013.01); *H02J 50/00* (2016.02); *H01F 27/36* (2013.01)

(58) Field of Classification Search
USPC ........................................................ 320/108
See application file for complete search history.

(56) References Cited

U.S. PATENT DOCUMENTS

| 2013/0154383 | A1* | 6/2013 | Kasturi | H04B 5/0087 307/104 |
| 2013/0328412 | A1 | 12/2013 | Meins et al. | |
| 2014/0111153 | A1* | 4/2014 | Kwon | H02J 7/025 320/108 |
| 2014/0210406 | A1 | 7/2014 | Na et al. | |
| 2016/0013659 | A1 | 1/2016 | Hatanaka et al. | |

FOREIGN PATENT DOCUMENTS

| KR | 10-2014-0053758 A | | 5/2014 |
| KR | 10-2014-0102301 | * | 8/2014 |
| KR | 10-2014-0102301 A | | 8/2014 |

* cited by examiner

WIRELESS POWER TRANSMISSION DEVICE AND WIRELESS POWER CHARGING SYSTEM INCLUDING THE SAME

CROSS REFERENCE TO RELATED APPLICATIONS

This application is the National Phase of PCT International Application No. PCT/KR2015/013095, filed on Dec. 2, 2015, which claims priority under 35 U.S.C. 119(a) to Patent Application No. 10-2014-0176123, filed in Republic of Korea on Dec. 9, 2014, all of which are hereby expressly incorporated by reference into the present application.

TECHNICAL FIELD

The present invention relates to a wireless power charging system and, more particularly, to a wireless power transmission apparatus of a wireless power charging system.

BACKGROUND ART

In general, each of various types of electronic apparatus has a battery. Such an electronic apparatus is driven using power charged in the battery. The battery of the electronic apparatus may be replaced with new one or may be recharged. To this end, the electronic apparatus includes a contact terminal contacting an external charging device. That is, the electronic apparatus is electrically connected to the charging device through the contact terminal. However, as the contract terminal of the electronic apparatus is externally exposed, the contact terminal is contaminated by foreign materials or short-circuited by humidity. In this case, contact failure may occur between the contact terminal and the charging device and thus the battery of the electronic apparatus may not be charged.

In order to solve the above-described problem, a wireless power charging system for wirelessly charging an electronic apparatus has been proposed. The wireless power charging system includes a wireless power transmission apparatus and a wireless power reception apparatus. The wireless power transmission device wirelessly transmits power and the wireless power reception device wirelessly receives power. Here, the electronic apparatus may include the wireless power reception device or may be electrically connected to the wireless power reception device. At this time, the wireless power reception device should be disposed in a predetermined charging region of the wireless power transmission device. In particular, if the wireless power charging system is implemented using a resonance method, the wireless power transmission device needs to be designed to have the same coupling coefficient regardless of the position of the wireless power reception device. Otherwise, since a transmit power amount change range adjusted by the wireless power transmission device increases according to the position of the wireless power reception device, cost required to implement the wireless power charging system may increase and efficiency of the wireless power charging system may deteriorate.

DISCLOSURE

Technical Problem

The present invention provides a wireless power transmission device having improved power transmission efficiency. In particular, the present invention provides a wireless power transmission device having the uniform coupling coefficient according to position thereof and having an extended chargeable region.

Technical Solution

A wireless power transmission device includes a mounting member, first and second terminals mounted on the mounting member and a transmission coil connected to the first and second terminals. The transmission coil includes an outer transmission coil and an inner transmission coil extending from the outer transmission coil and having a radius less than that of the outer transmission coil, and a distance between the outer transmission coil and the inner transmission coil is in a range from 20 mm to 30 mm.

A wireless power charging system includes a wireless power transmission device including an outer transmission coil and an inner transmission coil and a wireless power reception device including a reception coil. A distance between the outer transmission coil and the inner transmission coil is half a width of the reception coil.

Advantageous Effects

In a wireless power transmission device according to the present invention, a plurality of transmission coils is symmetrically formed and thus the shape of the magnetic field formed by the transmission coils is bilaterally symmetrical. Therefore, the coupling coefficient of the wireless power transmission device and the wireless power reception device may be uniform according to the position of the wireless power transmission device. Accordingly, since it is possible to decrease a transmit power amount change range adjusted by the wireless power transmission device, it is possible to decrease cost required to implement the wireless power charging system and to improve efficiency of the wireless power charging system.

BEST MODE

Exemplary embodiments of the present invention will be described below in detail with reference to the accompanying drawings in which the same reference numbers are used throughout this specification to refer to the same or like parts. A detailed description of known functions and configurations will be omitted when it may obscure the subject matter of the present invention.

Figure 1:
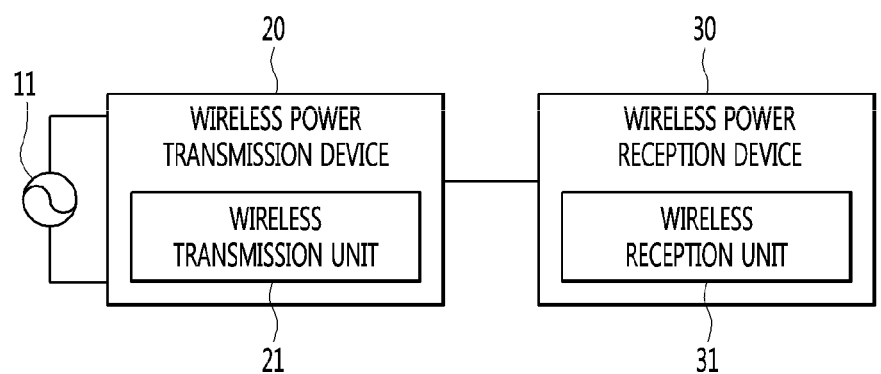
FIG. 1 is a block diagram showing a general wireless power charging system.

FIG. 1 is a block diagram showing a general wireless power charging system, and FIGS. 2a, 2b, 2c, 2d and 2e are circuit diagrams showing the equivalent circuit of a wireless transmission unit and a wireless reception unit of FIG. 1.

Referring to FIG. 1, the general wireless power charging system 10 includes a wireless power transmission device 20 and a wireless power reception device 30.

The wireless power transmission device 20 is connected to a power supply 11 to receive power from the power supply 11. The wireless power transmission device 20 wirelessly transmits power. Here, the wireless power transmission device 20 may transmit AC power. At this time, the wireless power transmission device 20 transmits power according to various charging methods. Here, the charging methods include an electromagnetic induction method, a resonance method and an RF/micro wave radiation method. That is, at least one of the charging methods may be predetermined in the wireless power transmission device 20. In addition, the wireless power transmission device 20 may transmit power using the predetermined charging method. The wireless power transmission device 20 includes a wireless transmission unit 21.

A wireless power reception device 30 wirelessly receives power. Here, the wireless power reception device 30 may receive AC power. The wireless power reception device 30 may convert AC power into DC power. At this time, the wireless power reception device 30 receives power according to various charging methods. Here, the charging methods include an electromagnetic induction method, a resonance method and an RF/micro wave radiation method. That is, at least one of the charging methods may be predetermined in the wireless power reception device 30. In addition, the wireless power reception device 30 may receive power using the predetermined charging method. In addition, the wireless power reception device 30 may be driven using power. The wireless power reception device 30 includes a wireless reception unit 31.

At this time, in order for the wireless power transmission device 20 to transmit power to the wireless power reception device 30, the charging method of the wireless power transmission device 20 and the charging method of the wireless power reception device 30 should be the same.

Figure 2A:
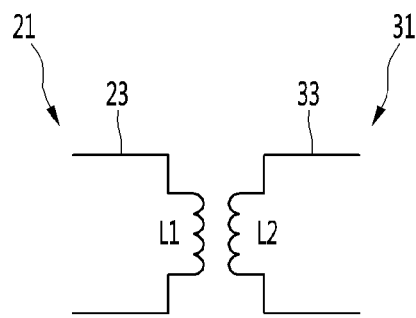
FIGS. 2a, 2b, 2c, 2d and 2e are circuit diagrams showing the equivalent circuit of a wireless transmission unit and a wireless reception unit of FIG. 1.

For example, if the charging method of the wireless power transmission device 20 and the charging method of the wireless power reception device 30 are the electromagnetic induction methods, the wireless transmission unit 21 and the wireless reception unit 31 may be represented as shown in FIG. 2a. The wireless transmission unit 21 may include a transmission induction coil 23. At this time, the transmission induction coil 23 may be represented by a transmission inductor L1. The wireless reception unit 31 may include a reception induction coil 33. At this time, the reduction induction coil 33 may be represented by a reception inductor L2. If the reception induction coil 33 is provided to face the transmission induction coil 23, the transmission induction coil 23 may transmit power to the reception induction coil 33 using the electromagnetic induction method.

Meanwhile, if the charging method of the wireless power transmission device 20 and the charging method of the wireless power reception device 30 are the resonance methods, the wireless transmission unit 21 and the wireless reception unit 31 may be represented as shown in FIGS. 2b, 2c, 2d and 2e.

Figure 2B:
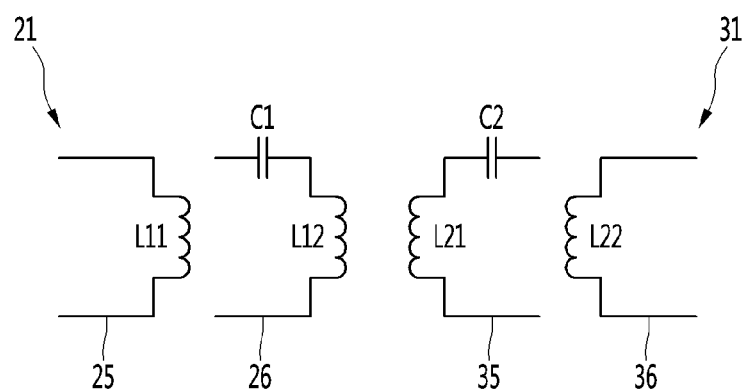
Figure 2C:
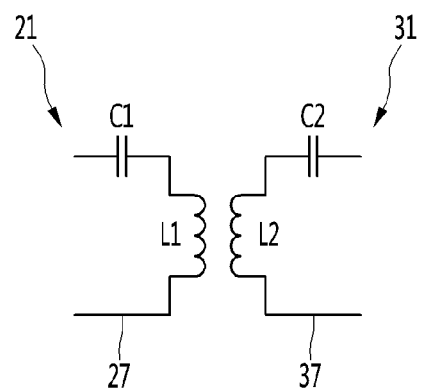
Figure 2D:
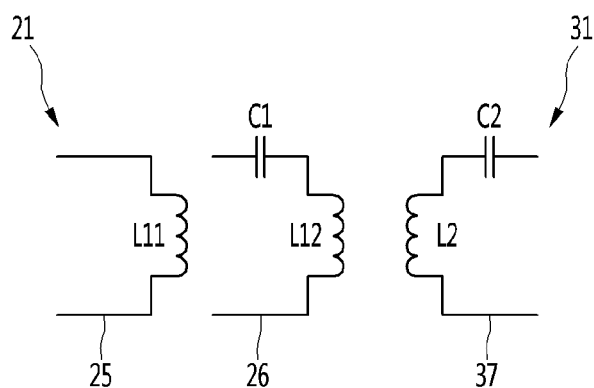
Figure 2E:
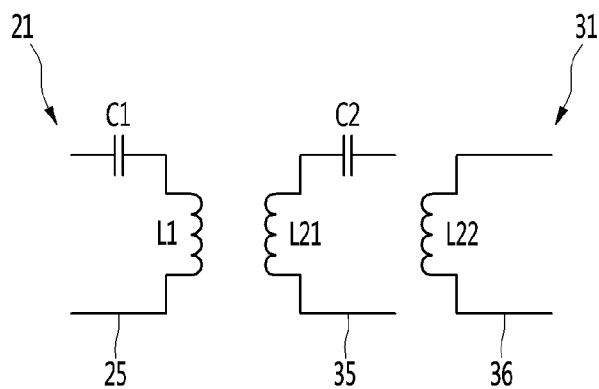

The wireless transmission unit 21 may include a transmission induction coil 25 and a transmission resonance coil 26 as shown in FIGS. 2b and 2d. At this time, the transmission induction coil 25 and the transmission resonance coil 26 may be provided to face each other. In addition, the transmission induction coil 25 may be represented by a first transmission inductor L11. In addition, the transmission resonance coil 26 may be represented by a second transmission inductor L12 and a transmission capacitor C1. Here, the second transmission inductor L12 and the transmission capacitor C1 may be connected to each other in parallel to form a closed loop. Alternatively, the wireless transmission unit 21 may include a transmission resonance coil 27 as shown in FIGS. 2c and 2e. At this time, the transmission resonance coil 27 may be represented by the transmission inductor L1 and the transmission capacitor C1. Here, the transmission inductor L1 and the transmission capacitor C1 may be connected in series.

The wireless reception unit 31 may include a reception resonance coil 35 and a reception induction coil 36 as shown in FIGS. 2b and 2e. At this time, the reception resonance coil 35 and the reception induction coil 36 may be provided to face each other. In addition, the reception resonance coil 35 may be represented by a reception capacitor C2 and a first reception inductor L21. Here, the reception capacitor C2 and the first reception inductor L21 may be connected to each other in parallel to form a closed loop. The reception induction coil 36 may be represented by a second reception inductor L22. Alternatively, the wireless reception unit 31 may include a reception resonance coil 37 as shown in FIGS. 2c and 2d. At this time, the reception resonance coil 37 may be represented by the reception inductor L2 and the reception capacitor C2. Here, the reception inductor L2 and the reception capacitor C2 may be connected in series.

If the reception resonance coil 35 is provided to face the transmission resonance coil 26, the transmission resonance coil 26 may transmit power to the reception resonance coil 35 using the resonance method. At this time, the transmission induction coil 25 may deliver power to the transmission resonance coil 26 using the electromagnetic induction method and the transmission resonance coil 26 may transmit power to the reception resonance coil 35 using the resonance method. Alternatively, the transmission resonance coil 26 may directly transmit power to the reception resonance coil 35 using the resonance method. The reception resonance coil 35 may receive power from the transmission resonance coil 26 using the resonance method and the reception induction coil 36 may receive power from the reception resonance coil 35 using the electromagnetic induction method. Alternatively, the reception resonance coil 35 may receive power from the transmission resonance coil 26 using the resonance method.

In the wireless power charging system 10, a quality factor and a coupling coefficient are of importance. At this time, as the quality factor and the coupling coefficient increase, efficiency of the wireless power charging system 10 is improved.

The quality factor indicates the index of energy capable of being accumulated in the peripheral region of the wireless power transmission device 20 or the wireless power reception device 30. At this time, the quality factor may be determined according to the operation frequency w, shape, size, material, etc. of the transmission coils 23, 25, 26 and 27 of the wireless transmission unit 21 or the reception coils 33, 35, 36 and 37 of the wireless reception unit 31. The quality factor may be calculated by an equation of $Q=w*L/R$. Here, L denotes inductance of the transmission coils 23, 25, 26 and 27 or the reception coils 33, 35, 36 and 37, R denotes resistance corresponding to power loss generated by the transmission coils 23, 25, 26 and 27 or the reception coils 33, 35, 36 and 37. In addition, the quality factor has a value of 0 to infinity.

The coupling coefficient indicates a magnetic coupling degree of the wireless power transmission device 20 and the wireless power reception device 30. At this time, the coupling coefficient may be determined according to the relative position or distance of the transmission coils 23, 25, 26 and 27 of the wireless transmission unit 21 and the reception coils 33, 35, 36 and 37 of the wireless reception unit 31. The coupling coefficient may have a value from 0 to 1.

Figure 3:
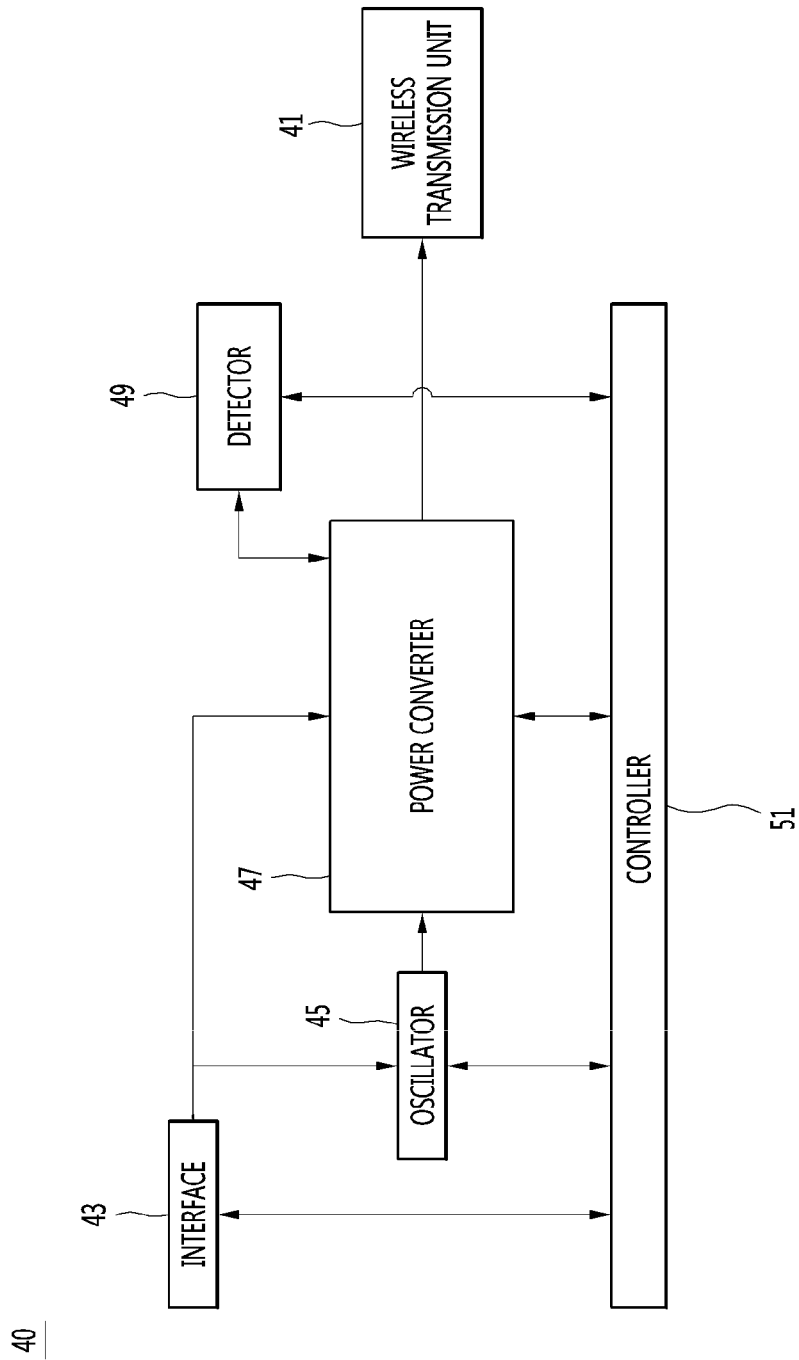
FIG. 3. is a block diagram showing a general wireless power transmission device.

FIG. 3. is a block diagram showing a general wireless power transmission device.

Referring to FIG. 3, the general wireless power transmission device 40 includes a wireless transmission unit 41, an interface 43, an oscillator 45, a power converter 47, a detector 49 and a controller 51.

The wireless transmission unit 41 of the wireless power transmission device 40 wirelessly transmits power. At this time, the wireless transmission unit 41 transmits power according to a plurality of charging methods. Here, the charging methods include an electromagnetic induction method, a resonance method and an RF/micro wave radiation method. At this time, the wireless transmission unit 41 may include at least one transmission coil. Here, the transmission coil may include at least one of a transmission induction coil or a transmission resonance coil according to the charging method.

The interface 43 provides interface with the power supply 11 in the wireless power transmission device 40. That is, the interface 43 is connected to the power supply 11. Here, the interface 43 may be connected to the power supply 11 by wire. The interface 43 receives power from the power supply 11. Here, the interface 43 receives DC power from the power supply 11.

The oscillator 45 generates an AC signal. At this time, the oscillator 45 generates an AC signal in correspondence with the charging method of the wireless transmission unit 41. Here, the oscillator 45 generates an AC signal having a predetermined frequency.

The power converter 47 converts power and provides the converted power to the wireless transmission unit 41. At this time, the power converter 47 receives DC power from the interface 43 and receives the AC signal from the oscillator 45. In addition, the power converter 47 generates AC power using the DC power and the AC signal. Here, the power converter 47 may amplify and use the AC signal. In addition, the power converter 47 outputs AC power to the wireless transmission unit 41. The power converter 47 may have a push-pull type structure. The push-pull type structure refers to a structure in which a pair of switches, transistors or arbitrary circuit blocks alternately operate to alternately output a response.

The detector 49 detects a power transmission state of the wireless power transmission device 40. At this time, the detector 49 may detect the intensity of current between the power converter 47 and the wireless transmission unit 41. Here, the detector 49 may detect the intensity of current at the output terminal of the power converter 47 or the input terminal of the wireless transmission unit 41. The detector 49 may include a current sensor. Here, a current transformer (CT) may be used as a current sensor.

The controller 51 controls overall operation of the wireless power transmission device 40. At this time, the controller 51 operates the wireless transmission unit 41 to wirelessly transmit power. Here, the controller 51 controls the power converter 47 to provide power to the wireless transmission unit 41. To this end, the controller 51 operates the wireless transmission unit 41 to determine whether the wireless power reception device (30 of FIG. 1) is present. Here, controller 51 controls the detector 49 to determine whether the wireless power reception device 30 is present. That is, the controller 51 determines whether the wireless power reception device 30 is present according to the power transmission state of the wireless power transmission device 40. In addition, if the wireless power reception device 30 is present, the controller 51 operates the wireless transmission unit 41 to wirelessly transmit power.

At this time, as the wireless power transmission device 40 and the wireless power reception device 30 become close to each other, the intensity of current detected by the detector 49 may increase. This may mean that the coupling coefficient of the wireless power transmission device 40 and the wireless power reception device 30 is high. Meanwhile, as the wireless power transmission device 40 and the wireless power reception device 30 are separated from each other, the intensity of current detected by the detector 49 may decrease. This may mean that the coupling coefficient of the wireless power transmission device 40 and the wireless power reception device 30 is low.

Figure 4:
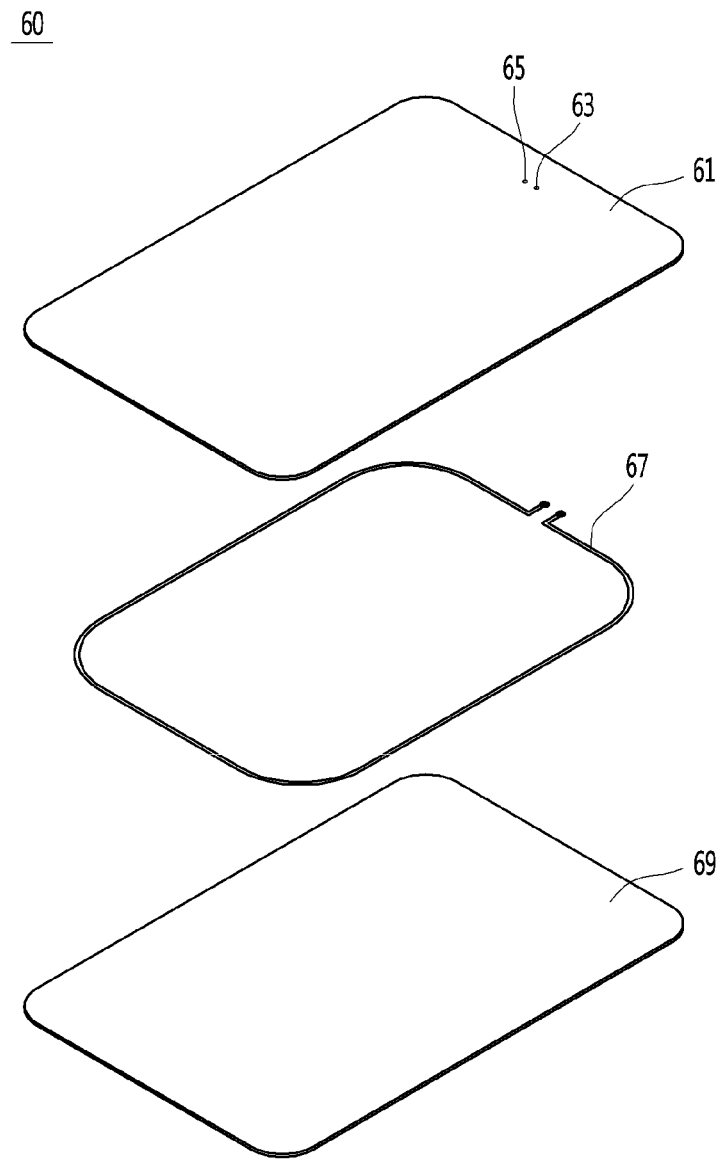
FIG. 4 is an exploded perspective view showing a general wireless transmission unit.
Figure 5:
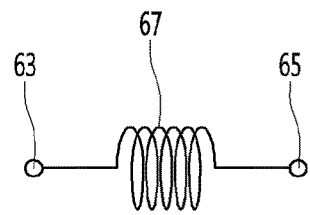
FIG. 5 is a circuit diagram showing the equivalent circuit of a general wireless transmission unit.
Figure 6:
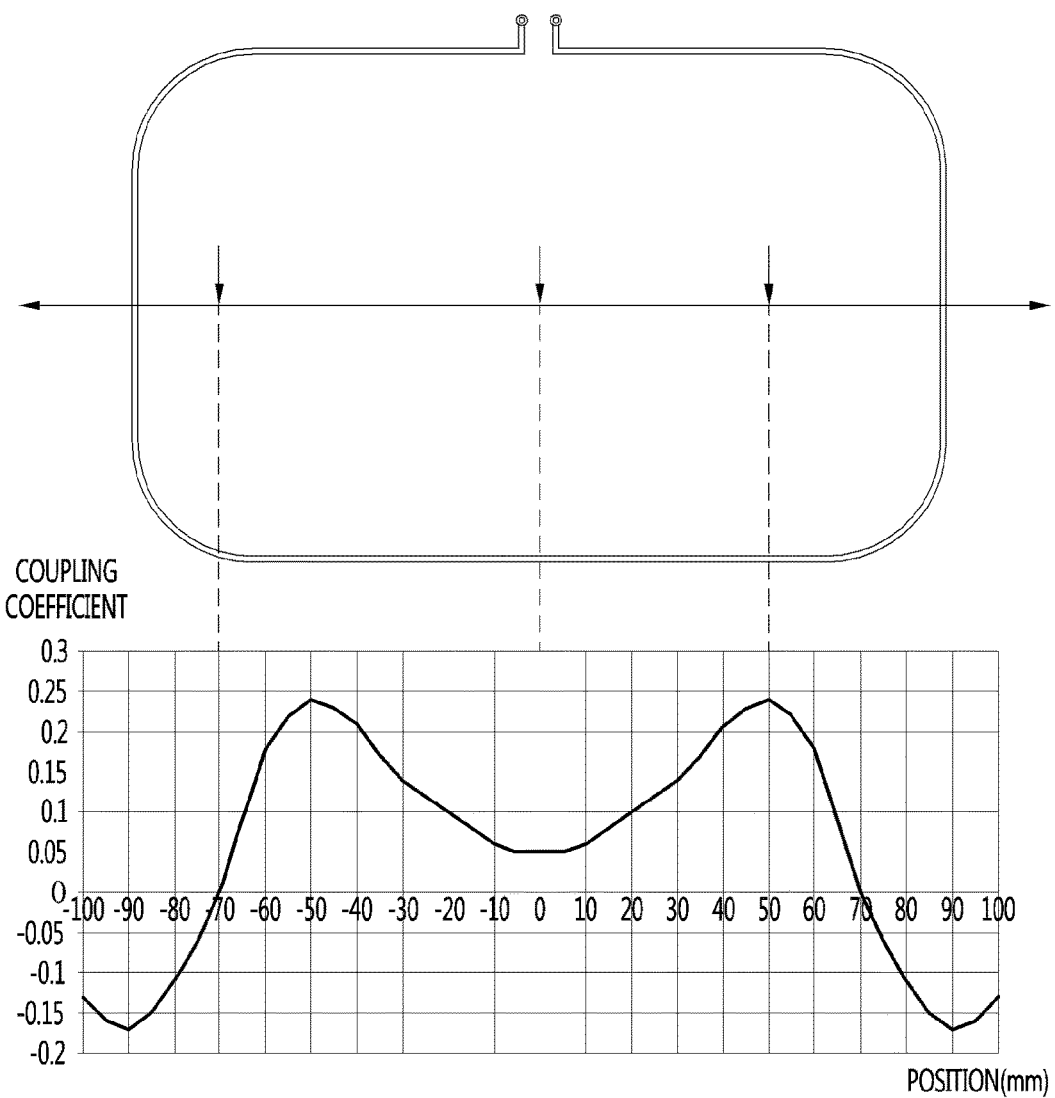
FIG. 6 is a graph illustrating a coupling coefficient in a general wireless transmission unit.

FIG. 4 is an exploded perspective view showing a general wireless transmission unit. FIG. 5 is a circuit diagram showing the equivalent circuit of a general wireless transmission unit. FIG. 6 is a graph illustrating a coupling coefficient in a general wireless transmission unit.

Referring to FIG. 4, the general wireless transmission unit 60 includes a mounting member 61, a first terminal 63, a second terminal 65, a transmission coil 67 and a shielding member 69. At this time, the wireless transmission unit 60 transmits power using the resonance method.

The mounting member 61 supports the first terminal 63, the second terminal 65 and the transmission coil 67. At this time, the mounting member 61 may have a single-layer structure or a multi-layer structure. The mounting member 61 includes a printed circuit board (PCB), a flexible PCB (FPCB) and a film.

The first terminal 63 and the second terminal 65 alternately input current to the transmission coil 67. The first terminal 63 and the second terminal 65 alternately output current from the transmission coil 67. For example, when the first terminal 63 inputs current to the transmission coil 67, the second terminal 65 outputs current from the transmission coil 67. Meanwhile, when the second terminal 65 inputs current to the transmission coil 67, the first terminal 63 outputs current from the transmission coil 67. Here, the first terminal 63 and the second terminal 65 may be connected to the power converter (47 of FIG. 3).

The first terminal 63 and the second terminal 65 are mounted on the mounting member 61. At this time, the first terminal 63 and the second terminal 65 are provided on one surface of the mounting member 61. That is, the first terminal 63 and the second terminal 65 are provided on the upper or lower surface of the mounting member 61. The first terminal 63 and the second terminal 65 may be formed of a conductive material.

The transmission coil 67 transmits power according to a predetermined charging method. Here, the charging method includes an electromagnetic induction method, a resonance method and an RF/micro wave radiation method. At this time, the transmission coil 67 operates in a predetermined resonance frequency band to transmit power. Here, when current is delivered along the transmission coil 67, an electromagnetic field may be formed in the peripheral region of the transmission coil 67.

The transmission coil 67 is mounted on the mounting member 61. At this time, the transmission coil 67 is provided on one surface of the mounting member 61. That is, the transmission coil 67 is provided on the upper or lower surface of the mounting member 61. Here, the transmission coil 67 has one turn. For example, the transmission coil 67 may be formed in a circular or rectangular shape. The transmission coil 67 is connected to the first terminal 63 and the second terminal 65 at both ends thereof. Here, the transmission coil 67 may be represented by one capacitor as shown in FIG. 5. In addition, the transmission coil 67 may be formed of a conductive material. Alternatively, the transmission coil 67 may include a conductive material and an insulating material and the conductive material may be coated with the insulating material.

The shielding member 69 shields the transmission coil 67. That is, the shield member 69 shields the transmission coil 67 from the other components of the wireless power transmission device (40 of FIG. 3). At this time, the shield member 69 has predetermined physical properties. Here, the physical properties include permeability. The permeability of the shield member 69 may be maintained in the resonance frequency band of the transmission coil 67. Therefore, the loss rate of the shield member 69 may be suppressed in the resonance frequency band of the transmission coil 67.

In general, the coupling coefficient of the wireless transmission unit 60 and the wireless reception unit (31 of FIG. 1) is not uniform according to position as shown in FIG. 6. That is, the coupling coefficient of the wireless transmission unit 60 and the wireless reception unit 31 is high at a position close to the wire of the transmission coil 67. This is because the intensity of the magnetic field is high at the position close to the wire of the transmission coil 67. The coupling coefficient of the wireless transmission unit 60 and the wireless reception unit 31 is low at a position corresponding to the center of the transmission coil 67. Therefore, the chargeable region of the wireless transmission unit 60 is narrow.

Figure 7:
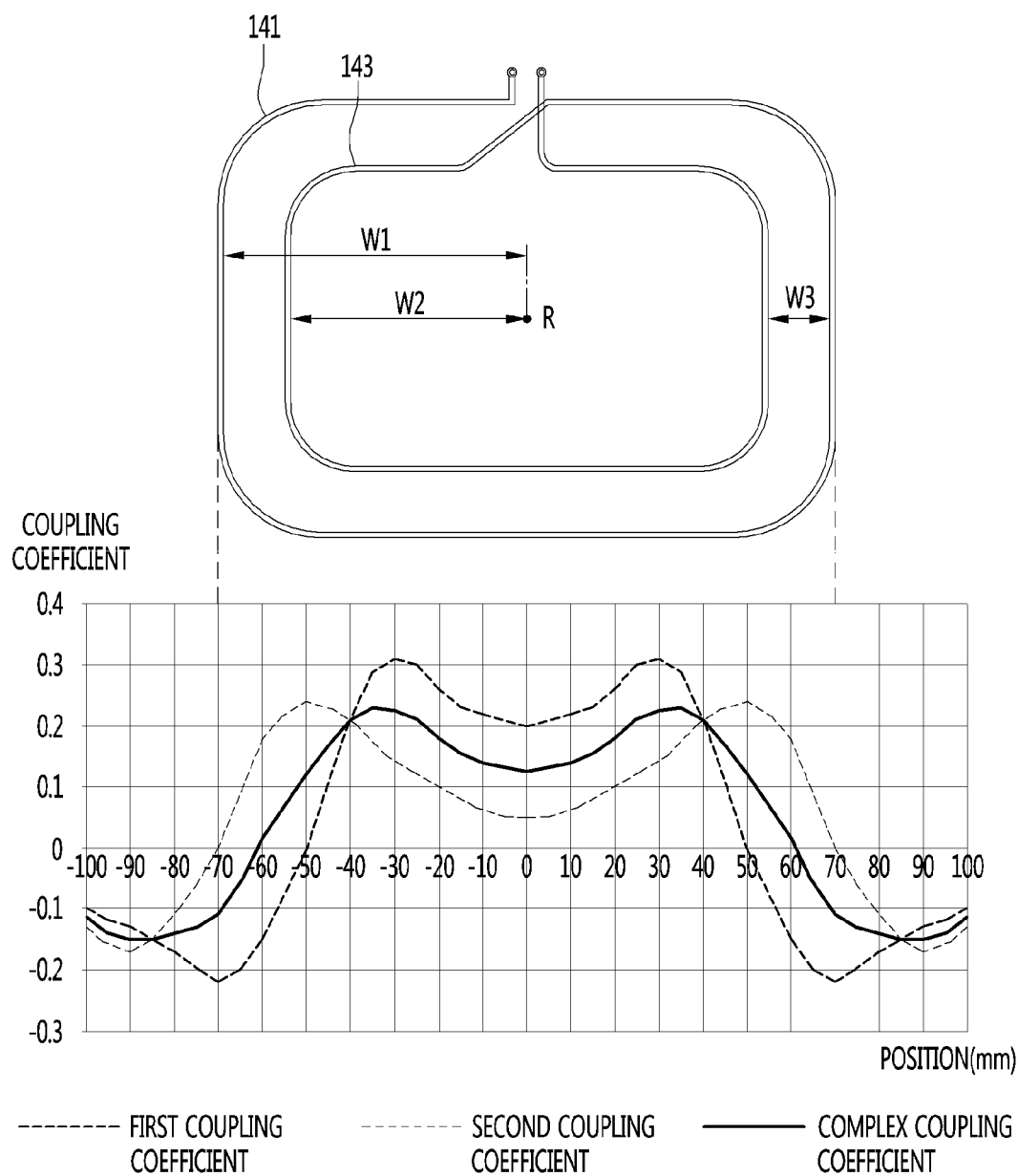
FIG. 7 is a graph illustrating a coupling coefficient in a wireless transmission unit according to a first embodiment of the present invention.

FIG. 7 is a graph illustrating a coupling coefficient in a wireless transmission unit according to a first embodiment of the present invention.

Referring to FIG. 7, the transmission coil 140 includes an outer transmission coil 141 and an inner transmission coil 143. The inner transmission coil 143 extends to the outer transmission coil 141 and the radius W2 of the inner transmission coil 143 may be less than the radius W1 of the outer transmission coil 141.

In some embodiments, a distance W3 between the outer transmission coil 141 and the inner transmission coil 143 of the transmission coil 140 may be in a range from 20 mm to 30 mm. A complex coupling coefficient may be the coupling coefficient of the transmission coil 140 including the outer coil 141 and the inner transmission coil 143 and the reception coil, a first coupling coefficient may be a coupling coefficient of the transmission coil including only the outer transmission coil 141 and the reception coil, and a second coupling coefficient may be a coupling of the transmission coil including only the inner transmission coil 143 and the reception coil. That is, the complex coupling coefficient may be an average of the coupling coefficient of the outer transmission coil 141 and the reception coil and the coupling coefficient of the inner transmission coil 143 and the reception coil.

In some embodiments, the outer transmission coil 141 and the inner transmission coil 143 may have one turn, without being limited thereto. In some embodiments, the outer transmission coil 141 may be a multi-turn coil, without being limited thereto.

Referring to the graph illustrating the coupling coefficient according to position, change in complex coupling coefficient according to position may be less than change in first coupling coefficient or second coupling coefficient according to position. For example, when the position is 0, the first coupling coefficient is 0.2, the second coupling coefficient is 0.05 and the complex coupling coefficient is 0.13. When the position is 50, the first coupling coefficient is 0, the second coupling coefficient is 0.23 and the complex coupling coefficient is 0.12. That is, the complex coupling coefficient of the transmission coil 140 according to the embodiment is greater than the first coupling coefficient when the position is 0 and change in coupling coefficient may decrease as being farther from the center. That is, as the coupling coefficient increases and change in coupling coefficient decreases, efficiency of power transmission and reception of the transmission coil and the reception coil may increase.

In some embodiments, the charging region when the outer transmission coil is a double coil may be equal to the charging region when the outer transmission coil is a single coil.

Figure 8:
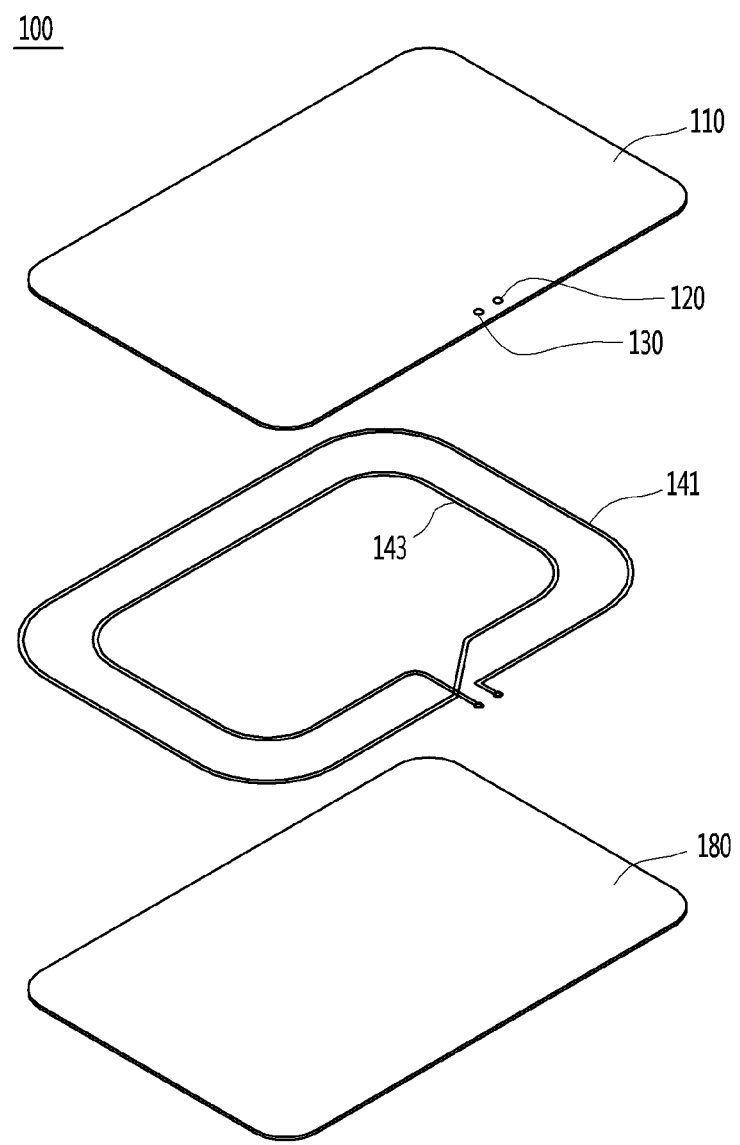
FIG. 8 is an exploded perspective view showing the wireless transmission unit according to the first embodiment of the present invention.

FIG. 8 is an exploded perspective view showing the wireless transmission unit according to the first embodiment of the present invention.

Referring to FIG. 8, the wireless transmission unit 100 of the present embodiment includes a mounting member 110, a first terminal 120, a second terminal 130, a transmission coil 140 including an outer transmission coil 141 and an inner transmission coil 143, and a shield member 180. At this time, the wireless transmission unit 100 transmits power using the resonance method.

The mounting member 110 supports the first terminal 120, the second terminal 130 and the transmission coil 140. At this time, the mounting member 110 may have a single-layer structure or a multi-layer structure. The mounting member 110 includes a printed circuit board (PCB), a flexible PCB (FPCB) and a film.

The first terminal 120 and the second terminal 130 alternately input current to the transmission coil 140. The first terminal 120 and the second terminal 130 alternately output current from the transmission coil 140. For example, when the first terminal 120 inputs current to the transmission coil 140, the second terminal 130 outputs current. Meanwhile, when the second terminal 120 inputs current to the transmission coil 140, the first terminal 120 outputs current from the transmission coil 140. Here, the first terminal 120 and the second terminal 130 may be connected to the power converter.

The first terminal 120 and the second terminal 130 are mounted on the mounting member 110. At this time, the first terminal 120 and the second terminal 130 are provided on one surface of the mounting member 110. The first terminal 120 and the second terminal 130 are withdrawn from the other surface of the mounting member 110. Here, the first terminal 120 may include a first terminal via (not shown) penetrating the mounting member 110 and may be withdrawn through the first terminal via. In addition, the second terminal 130 may include a second terminal via (not shown) penetrating the mounting member 110 and may be withdrawn through the second terminal via. In addition, the first terminal 120 and the second terminal 130 may be formed of a conductive material.

The transmission coil 140 transmits power according to a predetermined charging method. Here, the charging method includes an electromagnetic induction method, a resonance method and an RF/micro wave radiation method. At this time, the transmission coil 140 operates in a predetermined resonance frequency band to transmit power. Here, when the transmission coil 140 operates, an electromagnetic field may be formed in the peripheral region of the transmission coil 140.

The transmission coil 140 is mounted on the mounting member 110. The transmission coil 140 is connected to the first terminal 120 and the second terminal 130. That is, the transmission coil 140 is connected to the first terminal 120 and the second terminal 130 at both ends thereof.

In addition, the transmission coil 140 may be formed of a conductive material. Alternatively, the transmission coil 140 may include a conductive material and an insulating material and the conductive material may be coated with the insulating material.

Figure 9:
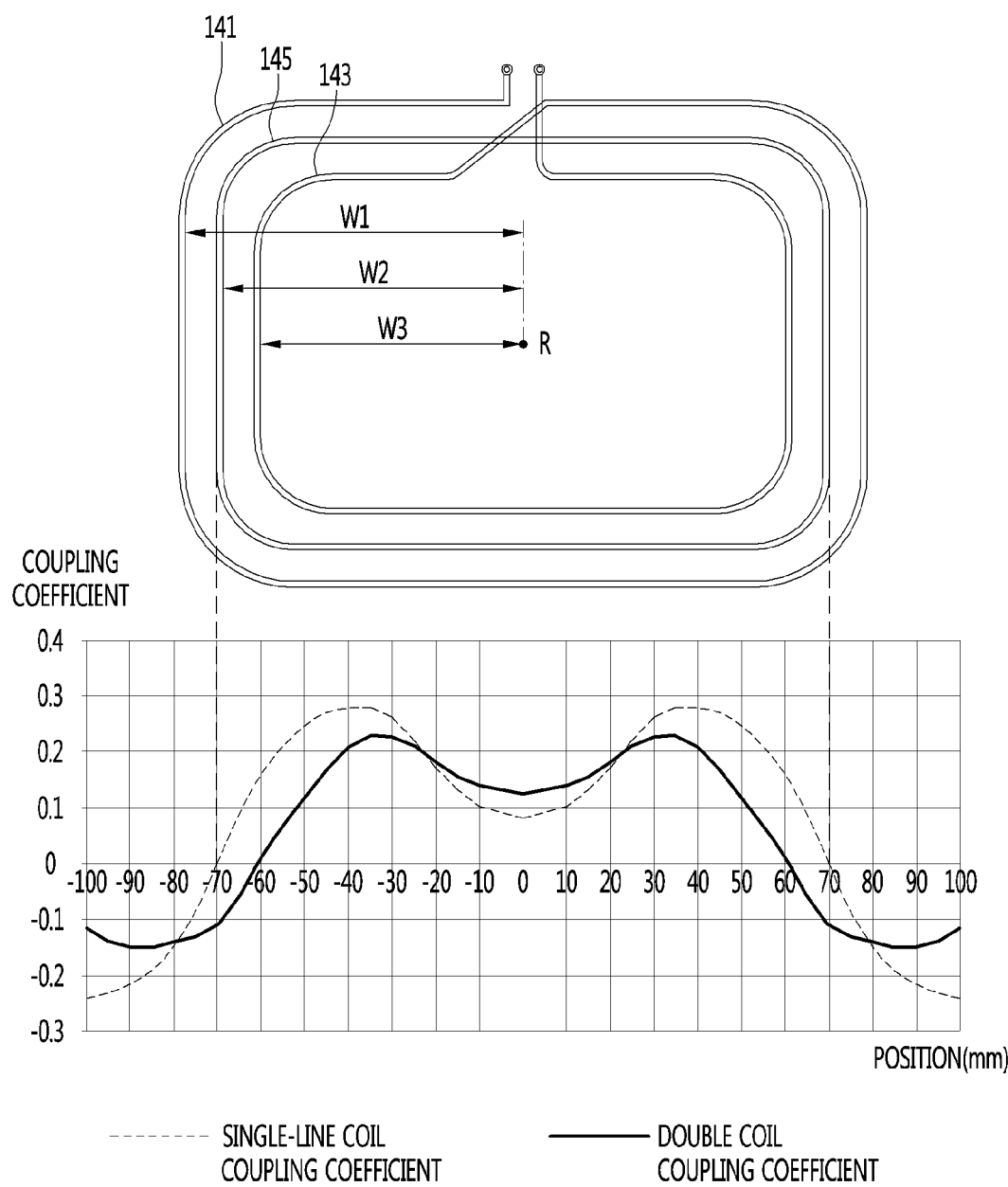
FIG. 9 is a graph illustrating comparison between the wireless transmission unit according to the first embodiment of the present invention and the related art.

FIG. 9 is a graph illustrating comparison between the wireless transmission unit according to the first embodiment of the present invention and the related art.

Referring to FIG. 9, the radius W2 of a single-line coil 145 may be less than the radius W1 of the outer transmission coil 141 and may be greater than the radius W3 of the inner transmission coil 143.

Referring to the graph illustrating the coupling coefficient according to position, change in complex coupling coefficient according to position may be less than change in coupling coefficient of the single-line coil according to position. For example, the coupling coefficient of the single-line coil 145 may be 0.08 at the center R, may be 0 when the position is 0, may be 0.28 as a maximum value when the position is 35. The complex coupling coefficient including the outer transmission coil 141 and the inner transmission coil 143 according to the embodiment may be 0.13 at the center R and may be 0.23 as a maximum value when the position is 35. That is, as the coupling coefficient increases and change in coupling coefficient decreases, efficiency of power transmission and reception of the transmission coil and the reception coil may increase. The transmission coil according to the embodiment has higher power efficiency and wider charging region than the single-line coil.

Figure 10:
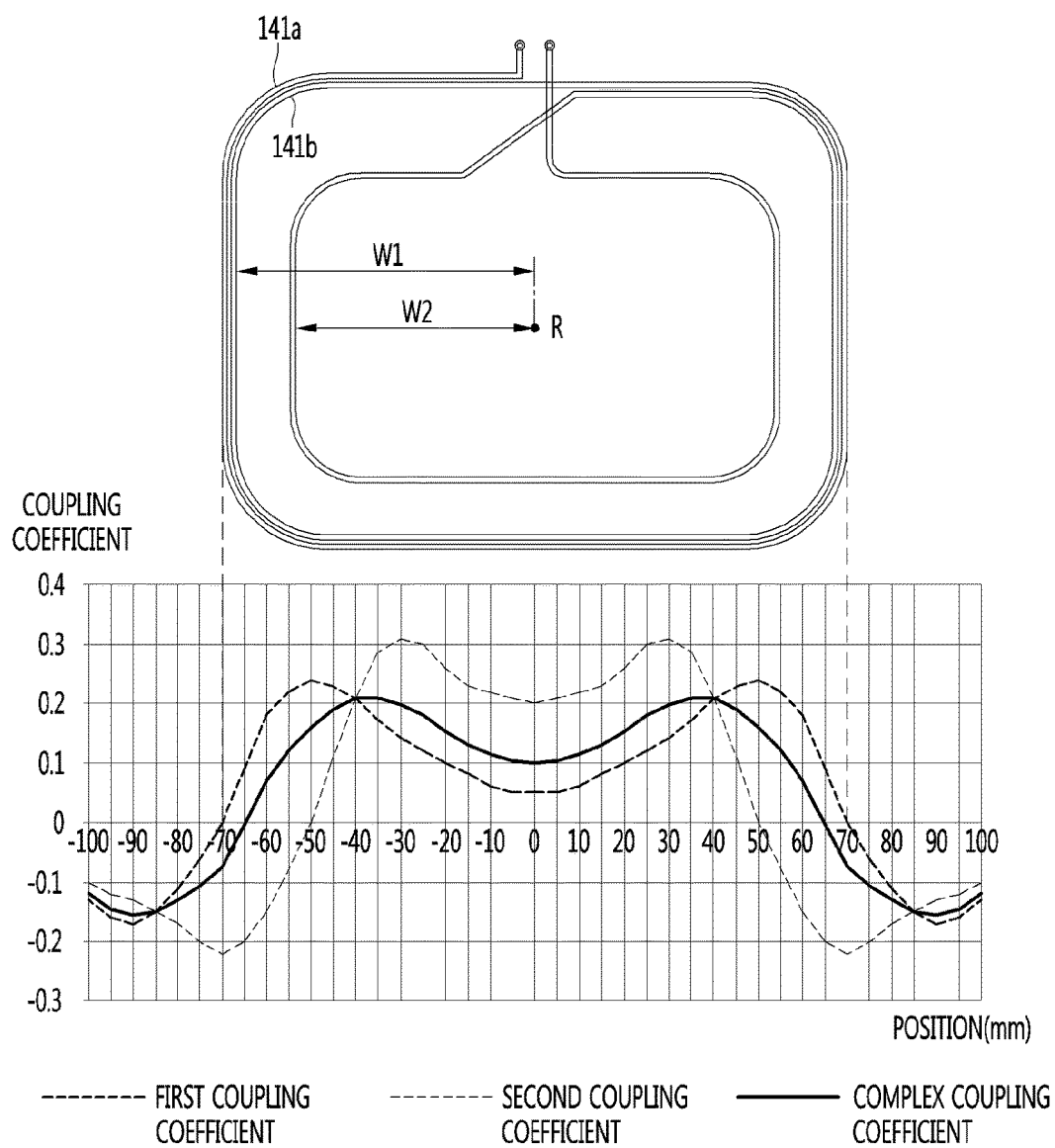
FIG. 10 is a graph illustrating a coupling coefficient in a wireless transmission unit according to a second embodiment of the present invention.

FIG. 10 is a graph illustrating a coupling coefficient in a wireless transmission unit according to a second embodiment of the present invention.

Referring to FIG. 10, in the wireless transmission unit according to the second embodiment, the outer transmission coil 141 may include a first outer transmission coil 141a and a second outer transmission coil 141b. That is, the outer transmission coil 141 may have a plurality of turns and change in complex coupling coefficient thereof may be less than that of the first embodiment. For example, in some embodiment, the complex coupling coefficient may be 0.1 at the center R and may be 0.2 as a maximum value when the position is 40. That is, as the coupling coefficient increases and change in coupling coefficient decreases, efficiency of power transmission and reception of the transmission coil and the reception coil may increase. The outer transmission coil 141 having the plurality of turns according to the embodiment has higher power efficiency and wider charging region than the single-line coil.

The invention claimed is:

1. A wireless power transmission device comprising:
   a mounting member;
   a first terminal and a second terminal mounted on the mounting member; and
   a transmission coil mounted on the mounting member, wherein the transmission coil includes:
   an outer transmission coil connected to the first terminal; and
   an inner transmission coil connected to the second terminal, and extending from the outer transmission coil and spaced apart from the outer transmission coil and being wound inside the outer transmission coil to correspond to the outer transmission coil, having a radius less than that of the outer transmission coil,
   wherein the outer transmission coil and the inner transmission coil are symmetrical with respect to a center of each of the outer and inner transmission coils, and
   wherein the inner transmission coil is wound 20 mm to 30 mm apart from the outer transmission coil.

2. The wireless power transmission device according to claim 1, wherein the outer transmission coil and the inner transmission coil have one turn.

3. The wireless power transmission device according to claim 1, wherein the outer transmission coil is a double coil.

4. A wireless power charging system comprising:
   a wireless power transmission device including an outer transmission coil and an inner transmission coil; and
   a wireless power reception device including a reception coil,
   wherein a distance between the outer transmission coil and the inner transmission coil is half a width of the reception coil.

5. The wireless power charging system according to claim 4, wherein a distance between the outer transmission coil and the inner transmission coil is in a range from 20 mm to 30 mm.

6. The wireless power charging system according to claim 4, wherein the outer transmission coil and the inner transmission coil have one turn.

7. The wireless power charging system according to claim 4, wherein the outer transmission coil is a double coil.

8. The wireless power charging system according to claim 7, wherein change in coupling coefficient with the reception coil according to position when the outer transmission coil is the double coil is less than change in coupling coefficient with the reception coil according to position when the outer transmission coil is a single coil.

9. The wireless power charging system according to claim 7, wherein a charging region when the outer transmission coil is the double coil is equal to a charging region when the outer transmission coil is a single coil.

10. The wireless power charging system according to claim 7, wherein a coupling coefficient of a transmission coil including the outer transmission coil and the inner transmission coil and the reception coil is an average of a coupling coefficient of a transmission coil including only the outer transmission coil and the reception coil and a coupling coefficient of a transmission coil including the inner transmission coil and the reception coil.

11. The wireless power charging system according to claim 10, wherein change in coupling coefficient of the transmission coil including the outer transmission coil and the inner transmission coil and the reception coil as being farther from a center of the inner transmission coil is small.

12. The wireless power charging system according to claim 10, wherein change in coupling coefficient of the transmission coil including the outer transmission coil and the inner transmission coil and the reception coil is less than change in coupling coefficient of the transmission coil including only the outer transmission coil and the reception coil as being farther from a center of the inner transmission coil.

13. The wireless power charging system according to claim 10, wherein change in coupling coefficient of the transmission coil including the outer transmission coil and the inner transmission coil and the reception coil is less than change in coupling coefficient of the transmission coil including only the inner transmission coil and the reception coil as being farther from a center of the inner transmission coil.

14. The wireless power charging system according to claim 10,
wherein the coupling coefficient of the transmission coil including the outer transmission coil and the inner transmission coil and the reception coil is 0.13 at the center of the inner transmission coil, and
wherein the coupling coefficient of the transmission coil including only the outer transmission coil and the reception coil is 0.2 at the center of the outer transmission coil and the coupling coefficient of the transmission coil including only the inner transmission coil and the reception coil is 0.05 at the center of the inner transmission coil.

* * * * *